US010558248B2

(12) United States Patent
Adrian

(10) Patent No.: US 10,558,248 B2
(45) Date of Patent: Feb. 11, 2020

(54) APPARATUS, SYSTEM, AND METHOD FOR INDICATING THE STATUS OF AND SECURING HARD DRIVES

(71) Applicant: Facebook, Inc., Menlo Park, CA (US)

(72) Inventor: Jason David Adrian, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/700,112

(22) Filed: Sep. 9, 2017

(65) Prior Publication Data
US 2019/0079565 A1    Mar. 14, 2019

(51) Int. Cl.
| H05K 7/00 | (2006.01) |
| G06F 1/18 | (2006.01) |
| G11B 33/12 | (2006.01) |
| G11B 33/10 | (2006.01) |

(52) U.S. Cl.
CPC ............. *G06F 1/187* (2013.01); *G11B 33/10* (2013.01); *G11B 33/124* (2013.01); *G11B 33/128* (2013.01); *G06F 1/181* (2013.01); *G06F 2200/163* (2013.01)

(58) Field of Classification Search
CPC ....................................................... H05K 5/00
See application file for complete search history.

(56) References Cited

U.S. PATENT DOCUMENTS

| 3,601,463 | A | 8/1971 | Watt |
| 3,996,500 | A | 12/1976 | Coules |
| D294,800 | S | 3/1988 | Nilsson |
| 4,969,065 | A | 11/1990 | Petri |
| 5,262,705 | A | 11/1993 | Hattori |
| 5,281,149 | A | 1/1994 | Petri |
| 5,724,803 | A | 3/1998 | Pea |
| 5,793,614 | A | 8/1998 | Tollbom |
| 5,957,659 | A | 9/1999 | Amou et al. |
| 6,021,044 | A | 2/2000 | Neville, Jr. et al. |
| 6,109,767 | A | 8/2000 | Rodriguez |
| 6,116,375 | A | 9/2000 | Lorch et al. |
| 6,159,031 | A | 12/2000 | Llapitan et al. |
| 6,181,549 | B1 | 1/2001 | Mills et al. |
| 6,331,915 | B1 * | 12/2001 | Myers ..................... G09F 9/33 359/599 |
| 6,385,051 | B1 | 5/2002 | Perez et al. |
| 6,404,646 | B1 | 6/2002 | Tsai et al. |

(Continued)

OTHER PUBLICATIONS

Jason David Adrian et al.; Apparatus, System, and Method for Reconfigurable Media-Agnostic Storage; U.S. Appl. No. 15/694,068, filed Sep. 1, 2017.

(Continued)

*Primary Examiner* — Jerry Wu
(74) *Attorney, Agent, or Firm* — FisherBroyles, LLP

(57) ABSTRACT

A drive latch apparatus may include a light pipe that transmits light across a distance. The apparatus may also include a light source coupled to a distal end of the light pipe. In addition, the apparatus may include a latch dimensioned to secure a hard drive to a chassis and coupled to a proximal end of the light pipe such that the light from the light source is transmitted to the latch and the latch refracts the light from the light source to emit a visible glow. Various other apparatuses, systems, and methods are also disclosed.

12 Claims, 6 Drawing Sheets

(56) References Cited

U.S. PATENT DOCUMENTS

| | | | |
|---|---|---|---|
| 6,469,899 B2 | 10/2002 | Hastings et al. | |
| 6,515,854 B1* | 2/2003 | Claprood | G06F 1/184 |
| | | | 312/331 |
| 6,552,915 B2 | 4/2003 | Takahashi et al. | |
| 6,621,692 B1 | 9/2003 | Johnson et al. | |
| 6,695,629 B1 | 2/2004 | Mayer | |
| 6,791,843 B1 | 9/2004 | Dobbs et al. | |
| 6,798,669 B1 | 9/2004 | Hsu | |
| 6,813,165 B2 | 11/2004 | Cheng et al. | |
| 6,987,674 B2 | 1/2006 | El-Batal et al. | |
| 6,995,982 B2 | 2/2006 | Gonzalez et al. | |
| 7,004,764 B2 | 2/2006 | Boudreau et al. | |
| 7,084,654 B2 | 8/2006 | Zhao et al. | |
| 7,088,579 B1* | 8/2006 | Konshak | G06F 1/184 |
| | | | 361/679.32 |
| 7,167,371 B2 | 1/2007 | Coles et al. | |
| 7,301,778 B1 | 11/2007 | Fang | |
| 7,304,855 B1 | 12/2007 | Milligan et al. | |
| 7,411,787 B2 | 8/2008 | Katakura et al. | |
| 7,423,354 B2 | 9/2008 | Suzuki et al. | |
| 7,505,286 B2 | 3/2009 | Brovald et al. | |
| 7,515,413 B1 | 4/2009 | Curtis | |
| 7,649,750 B2 | 1/2010 | Lee | |
| 8,020,902 B1 | 9/2011 | Li | |
| 8,127,059 B1 | 2/2012 | Carr et al. | |
| 8,203,851 B2 | 6/2012 | Boetzer | |
| 8,310,828 B2 | 11/2012 | Collins | |
| 8,331,095 B2 | 12/2012 | Hu et al. | |
| 8,369,080 B2 | 2/2013 | Huang | |
| 8,517,054 B2 | 8/2013 | Lai et al. | |
| 8,570,720 B2 | 10/2013 | Yao et al. | |
| 8,636,528 B2 | 1/2014 | Sass et al. | |
| 8,657,619 B2 | 2/2014 | Lin et al. | |
| 8,743,549 B2 | 6/2014 | Frink et al. | |
| 8,749,966 B1 | 6/2014 | Boudreau et al. | |
| 8,848,349 B2 | 9/2014 | Ke | |
| 8,944,538 B2 | 2/2015 | Li | |
| 8,971,052 B2 | 3/2015 | Fu | |
| 9,066,438 B2 | 6/2015 | Chen | |
| 9,070,419 B1 | 6/2015 | Zhu et al. | |
| 9,098,233 B2 | 8/2015 | Keffeler | |
| 9,101,210 B2 | 8/2015 | Lin | |
| 9,203,188 B1 | 12/2015 | Siechen et al. | |
| 9,274,548 B2 | 3/2016 | Foisy et al. | |
| 9,298,230 B2 | 3/2016 | Wei | |
| 9,313,909 B1 | 4/2016 | Huang | |
| 9,354,003 B2 | 5/2016 | Lin | |
| 9,448,601 B1 | 9/2016 | Beall et al. | |
| 9,454,190 B2 | 9/2016 | Mao et al. | |
| 9,456,519 B2 | 9/2016 | Bailey et al. | |
| 9,461,389 B2 | 10/2016 | Novack et al. | |
| 9,538,684 B2 | 1/2017 | Chen et al. | |
| 9,545,028 B2 | 1/2017 | Hoshino et al. | |
| 9,572,276 B2 | 2/2017 | Haroun | |
| 9,583,877 B1 | 2/2017 | Angelucci | |
| 9,609,778 B1 | 3/2017 | Spencer et al. | |
| 9,763,350 B2 | 9/2017 | Rust et al. | |
| 9,763,353 B1 | 9/2017 | Beall | |
| 9,795,052 B2 | 10/2017 | Hsiao et al. | |
| 9,936,611 B1 | 4/2018 | Beall et al. | |
| 9,949,407 B1 | 4/2018 | Beall | |
| 10,058,006 B2 | 8/2018 | Hung et al. | |
| 10,165,703 B1 | 12/2018 | Adrian | |
| 10,178,791 B1 | 1/2019 | Kho | |
| 10,240,615 B1 | 3/2019 | Kho et al. | |
| 10,264,698 B2 | 4/2019 | Kho et al. | |
| 10,372,360 B2 | 8/2019 | Adrian | |
| 2003/0123221 A1 | 7/2003 | Liao | |
| 2003/0183448 A1 | 10/2003 | Sleet et al. | |
| 2003/0200472 A1 | 10/2003 | Midorikawa et al. | |
| 2003/0200475 A1 | 10/2003 | Komoto | |
| 2005/0057909 A1 | 3/2005 | El-Batal et al. | |
| 2005/0136747 A1 | 6/2005 | Caveney et al. | |
| 2005/0182874 A1 | 8/2005 | Herz et al. | |
| 2005/0238421 A1 | 10/2005 | Doerr et al. | |
| 2006/0075155 A1 | 4/2006 | Fuller et al. | |
| 2006/0134953 A1 | 6/2006 | Williams et al. | |
| 2006/0146507 A1 | 7/2006 | Lee | |
| 2006/0274508 A1 | 12/2006 | LaRiviere et al. | |
| 2007/0195542 A1* | 8/2007 | Metros | B60Q 1/2669 |
| | | | 362/501 |
| 2007/0230111 A1 | 10/2007 | Starr et al. | |
| 2007/0233781 A1 | 10/2007 | Starr et al. | |
| 2007/0234081 A1 | 10/2007 | Makino et al. | |
| 2008/0007913 A1 | 1/2008 | Sullivan et al. | |
| 2008/0117569 A1 | 5/2008 | Lee | |
| 2008/0195786 A1 | 8/2008 | Lee | |
| 2008/0264192 A1 | 10/2008 | Christensen | |
| 2009/0245745 A1 | 10/2009 | Krampotich et al. | |
| 2009/0271950 A1 | 11/2009 | Wang | |
| 2009/0274429 A1 | 11/2009 | Krampotich et al. | |
| 2009/0310303 A1 | 12/2009 | Najbert | |
| 2010/0195304 A1 | 8/2010 | Takao | |
| 2010/0296791 A1 | 11/2010 | Makrides-Saravanos et al. | |
| 2011/0208937 A1 | 8/2011 | Hayashi et al. | |
| 2011/0273850 A1 | 11/2011 | Chen | |
| 2011/0299237 A1 | 12/2011 | Liang | |
| 2011/0309730 A1 | 12/2011 | Retchloff et al. | |
| 2012/0004772 A1 | 1/2012 | Rahilly et al. | |
| 2012/0020006 A1 | 1/2012 | Xu et al. | |
| 2012/0134086 A1 | 5/2012 | Zhang | |
| 2012/0230815 A1 | 9/2012 | Teramoto et al. | |
| 2012/0257360 A1 | 10/2012 | Sun | |
| 2012/0305745 A1 | 12/2012 | Chen et al. | |
| 2012/0320519 A1 | 12/2012 | Wu et al. | |
| 2013/0050955 A1 | 2/2013 | Shinsato et al. | |
| 2013/0058054 A1 | 3/2013 | Zhou | |
| 2013/0258580 A1 | 10/2013 | Nakayama | |
| 2013/0325183 A1 | 12/2013 | Rahilly | |
| 2014/0111930 A1 | 4/2014 | Henderson | |
| 2014/0118936 A1 | 5/2014 | Merlet et al. | |
| 2014/0187068 A1 | 7/2014 | Chia et al. | |
| 2014/0191636 A1 | 7/2014 | Li | |
| 2014/0369002 A1 | 12/2014 | Takeuchi et al. | |
| 2015/0156912 A1 | 6/2015 | Liang et al. | |
| 2015/0163946 A1 | 6/2015 | Kyle et al. | |
| 2015/0208548 A1 | 7/2015 | Chu et al. | |
| 2015/0235673 A1 | 8/2015 | Lo | |
| 2015/0380059 A1 | 12/2015 | Bell et al. | |
| 2016/0018859 A1 | 1/2016 | Mao et al. | |
| 2016/0042768 A1 | 2/2016 | Yang et al. | |
| 2016/0150659 A1 | 5/2016 | Chen et al. | |
| 2016/0150667 A1 | 5/2016 | Xu et al. | |
| 2016/0330858 A1 | 11/2016 | Ehlen | |
| 2017/0325361 A1 | 11/2017 | Chen et al. | |
| 2018/0168071 A1 | 6/2018 | Edge et al. | |
| 2018/0260349 A1 | 9/2018 | Mondal et al. | |
| 2019/0069432 A1 | 2/2019 | Kho et al. | |
| 2019/0069437 A1 | 2/2019 | Adrian et al. | |
| 2019/0069440 A1 | 2/2019 | Adrian | |
| 2019/0073008 A1 | 3/2019 | Adrian | |
| 2019/0075668 A1 | 3/2019 | Adrian et al. | |
| 2019/0090374 A1 | 3/2019 | Kho et al. | |
| 2019/0090376 A1 | 3/2019 | Kho et al. | |
| 2019/0098795 A1 | 3/2019 | Adrian | |

OTHER PUBLICATIONS

Jason David Adrian; Apparatus, System, and Method for Directing Air in a Storage-System Chassis; U.S. Appl. No. 15/689,650, filed Aug. 29, 2017.

Jason David Adrian et al.; Apparatus, System, and Method for Enabling Multiple Storage-System Configurations; U.S. Appl. No. 15/688,830, filed Aug. 28, 2017.

Jason David Adrian et al.; Apparatus, System, and Method for Securing Hard Drives in a Storage Chassis; U.S. Appl. No. 15/697,405, filed Sep. 6, 2017.

Jason David Adrian; Apparatus, System, and Method for Detecting Device Types of Storage Devices; U.S. Appl. No. 15/698,540, filed Sep. 7, 2017.

Chuankeat Kho et al.; Removeable Drive-Plane Apparatus, System, and Method; U.S. Appl. No. 15/693,362, filed Aug. 31, 2017.

(56) References Cited

OTHER PUBLICATIONS

Chuankeat Kho et al.; Systems and Methods for Mounting Assembly Pull-Handles; U.S. Appl. No. 15/687,406, filed Aug. 25, 2017.
Jason David Adrian; An Apparatus, System, and Method for Reconfiguring Air Flow Through a Chassis; U.S. Appl. No. 15/716,251, filed Sep. 26, 2017.
Jason Adrian; Introducing Bryce Canyon: Our next-generation storage platform; https://code.facebook.com/posts/1869788206569924/introducing-bryce-canyon-our-next-generation-storage-platform/; Mar. 8, 2017.
Jason Adrian et al.; Bryce Canyon Storage Specification; Jan. 31, 2017.
Open Compute Project; http://opencompute.org/; as accessed Sep. 29, 2017.
Jason David Adrian; Data-Center Drawer and Cable Track Assembly; U.S. Appl. No. 15/720,647, filed Sep. 29, 2017.
Bisson; How Facebook Does Storage; https://thenewstack.io/facebook-storage.
What's The Difference Between SATA And SAS Hard Drives?; https://www.pickaweb.co.uk/kb/difference-between-sata-sas-hard-drives/.
Chuankeat Kho; Apparatus, System, and Method for Securing Computing Components to Printed Circuit Boards; U.S. Appl. No. 15/713,607, filed Sep. 23, 2017.
Chuankeat Kho et al.; Apparatus, System, and Method for Partitioning a Storage-System Chassis; U.S. Appl. No. 15/708,069, filed Sep. 18, 2017.
Chuankeat Kho et al.; Apparatus, System, and Method for Dampening Vibrations Generated by Exhaust Fans; U.S. Appl. No. 15/713,609, filed Sep. 23, 2017.
Chuankeat Kho et al.; Apparatus, System, and Method for Resisting Shock to a Data-Center Rack; U.S. Appl. No. 15/708,075, filed Sep. 18, 2017.
Acoustic Attenuation; https://en.wikipedia.org/wiki/Acoustic_attenuation; Oct. 22, 2012.
Electromagnetic Shielding; https://en.wikipedia.org/wiki/Electromagnetic_shielding; May 15, 2016.

\* cited by examiner

APPARATUS, SYSTEM, AND METHOD FOR INDICATING THE STATUS OF AND SECURING HARD DRIVES

BACKGROUND

Large data centers may have rooms that contain multiple specialized racks to hold various types of computing equipment. In addition, each of these racks may hold multiple pieces of computing hardware that provide storage and computing power for organizations or individuals. For example, a data center may contain racks of hard drives and servers that process data and transmit information over a network. Over time, these pieces of hardware may require maintenance and may need to be swapped or updated with new equipment.

Traditionally, servicing hardware in a data center may require knowledge of the location of each individual piece of hardware. For example, when a hard drive failure is detected, a technician may need to identify the rack holding the hard drive and physically find the specific hard drive in the rack. However, each rack may contain a large quantity of the same equipment, and locating the correct hard drive in a multitude of hard drives may be difficult. For large data centers or "lights-out" data centers, in which lights are kept off to conserve energy and heat, finding the correct equipment to service may be an even more tedious process. Furthermore, when looking at the equipment in a rack, technicians may not be able to easily determine whether any computing components require servicing without performing additional tests. Therefore, data centers may need improved methods and systems to accurately and quickly identify particular hard drives and the states of these drives.

SUMMARY

As will be described in greater detail below, the instant disclosure describes various apparatuses, systems, and methods for indicating the status of and securing hard drives by locking hard drives in a chassis with drive latches that glow to indicate the states of the hard drives. In one example, a drive latch apparatus may include a light pipe that transmits light across a distance. The apparatus may also include a light source coupled to a distal end of the light pipe. Additionally, the apparatus may include a latch that is dimensioned to secure a hard drive to a chassis. In this example, the latch may be coupled to a proximal end of the light pipe such that the light from the light source is transmitted to the latch and the latch refracts the light from the light source to emit a visible glow. In some examples, the latch may secure the hard drive in a drive slot of the chassis.

In some embodiments, the light pipe may be dimensioned to transmit the light from the light source to the latch with a minimal amount of loss such that the transmitted light is within a range of visibility.

In some examples, the light source may include one or more light-emitting diodes coupled to the chassis. In these examples, the light from the light source may indicate a state of the hard drive by altering a state of the light and/or a color of the light. Furthermore, the color of the light may include a color of a light-emitting diode and/or a color of a combination of light-emitting diodes.

In one embodiment, the latch may be coupled to a locking mechanism that is dimensioned to lock the latch to the chassis. In this embodiment, the locking mechanism may also be dimensioned to unlock the latch as a force is exerted on the locking mechanism.

According to various embodiments, a corresponding hard drive rack system may include a rack dimensioned to hold computer hardware. The hard drive rack system ay also include one or more chassis coupled to the rack that contain a plurality of drive slots dimensioned to hold one or more hard drives. The system may additionally include one or more drive latches dimensioned to secure a hard drive in a drive slot and emit a visible glow to indicate a state of the hard drive. Furthermore, the system may include a computing component coupled to the rack such that the computing component detects the state of the hard drive.

In one example, a chassis may be dimensioned to slide perpendicular to a face of the rack such that the chassis extends away from the rack to expose the plurality of drive slots. In this example, a drive latch may emit the visible glow such that the drive latch is visible from the extended chassis.

In one embodiment, the drive latch may be coupled to a light pipe that transmits light across a distance. In this embodiment, a distal end of the light pipe may be coupled to a light source of one or more light-emitting diodes, and the light from the light source may indicate the state of the hard drive by altering a state of the light and/or a color of the light, which may include a color of a light-emitting diode and/or a color of a combination of light-emitting diodes. Additionally, in this embodiment, the light-emitting diode may be electrically coupled to the computing component such that the computing component alters the light from the light-emitting diode.

In addition to the various systems and apparatuses described herein, the instant disclosure presents exemplary methods for indicating the status of and securing hard drives. For example, a corresponding method may include coupling a light source to a distal end of a light pipe that transmits light across a distance. The method may also include dimensioning a latch to secure a hard drive to a chassis. In addition, the method may include coupling the latch to a proximal end of the light pipe such that the light from the light source is transmitted to the latch and the latch refracts the light from the light source to emit a visible glow.

In some examples, the light source of the above method may include one or more light-emitting diodes coupled to the chassis such that the light from the light source indicates a state of the hard drive by altering a state of the light and/or a color of the light. In these example, the color of the light of the above method may include a color of the light-emitting diode and/or a color of a combination of light-emitting diodes.

In some embodiments, dimensioning the latch to secure the hard drive to the chassis may include coupling the latch to a locking mechanism that is dimensioned to lock the latch to the chassis and unlock the latch as a force is exerted on the locking mechanism.

In one embodiment, the above method may further include dimensioning the light pipe to transmit the light from the light source to the latch with a minimal amount of loss such that the transmitted light is within a range of visibility.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Figure 1:
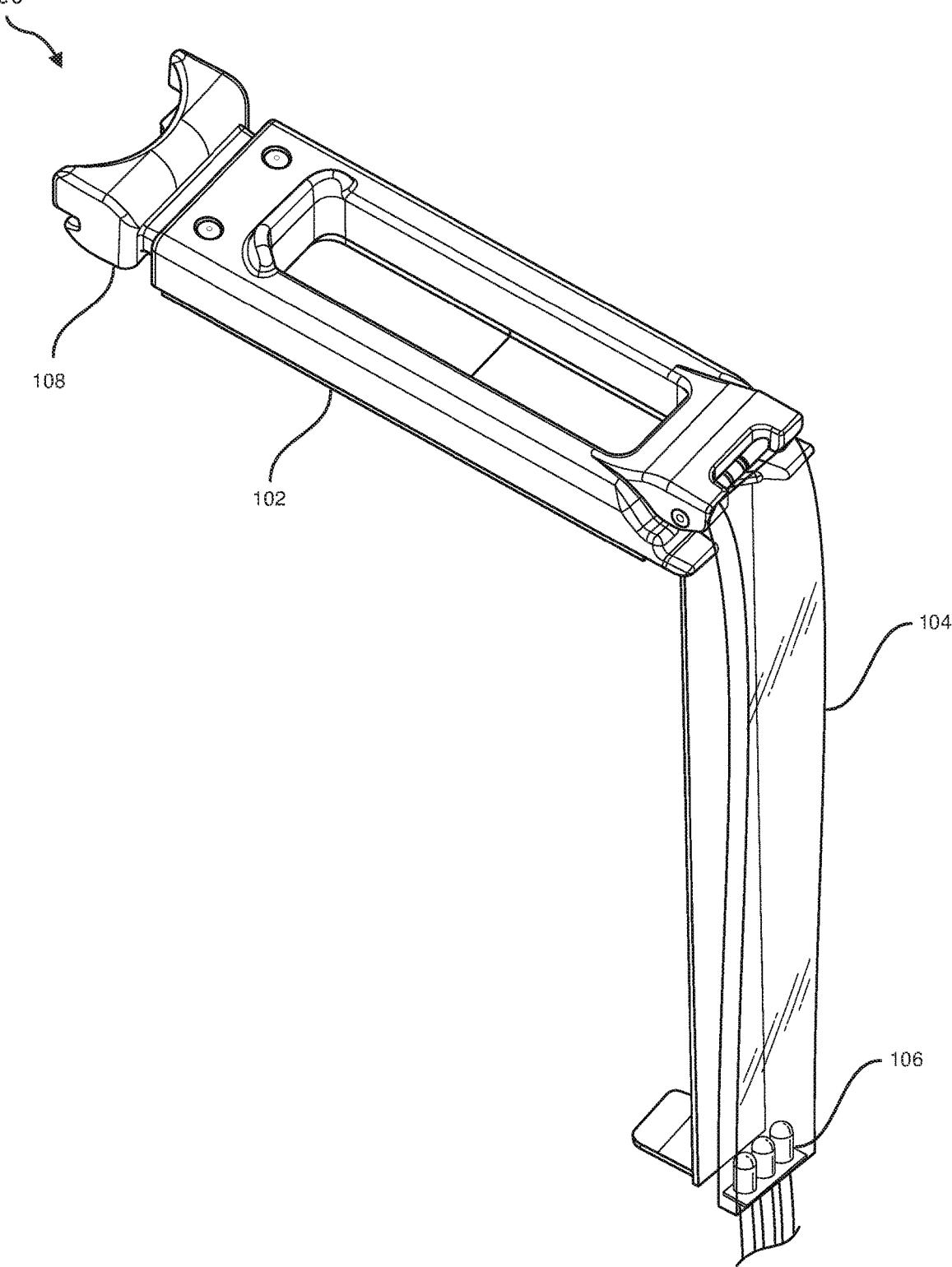
FIG. 1 is a perspective view of a drive latch apparatus for indicating the state of and securing hard drives.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes and illustrates various apparatuses, systems, and methods for indicating the status of and securing hard drives. As will be explained in greater detail below, embodiments of the instant disclosure may improve the display of hard drive status by implementing a glowing drive latch. The drive latch may secure a hard drive to a chassis in a data center rack. The drive latch may also glow to indicate a detected state of the hard drive secured in the chassis. For example, a set of light-emitting diodes may provide light carried by a light pipe to the drive latch. Additionally, the drive latch may refract the light from the light pipe to visibly glow within the chassis. Thus, the embodiments described herein may provide instant and/or easily identifiable indication of the state of hard drives while holding the hard drives securely in place.

The following will provide, with reference to FIG. 1, detailed descriptions of a drive latch apparatus that indicates the state of a hard drive. In addition, the discussion associated with FIGS. 2-3 will provide examples of the drive latch apparatus holding a hard drive in a locked position and an unlocked position, respectively. The discussion associated with FIG. 4 will provide an example of multiple drive latches and various states of hard drives in a chassis. Additionally, the discussion associated with FIG. 5 will provide an example of a hard drive rack system that implements the drive latch apparatuses. Finally, the discussion corresponding to FIG. 6 will provide example methods for manufacturing, assembling, configuring, and/or using the drive latch apparatuses presented herein.

FIG. 1 illustrates a perspective view of a drive latch apparatus 100 for indicating the state of and securing hard drives. The term "hard drive," as used herein, generally refers to a hardware medium that stores and/or processes data, typically using magnetic storage methods. Although described as being dimensioned to secure hard drives in the disclosed examples, drive latch apparatus 100 may also be dimensioned to indicate the states of and secure other types of computing equipment.

In some examples, drive latch apparatus 100 may include a light pipe 104 that transmits light across a distance. In these examples, drive latch apparatus 100 may also include a light source 106 coupled to a distal end of light pipe 104. As used herein, the term "light pipe" generally refers to a tube or pipe that guides light from a source to a destination. Light pipes may be flexible or inflexible to accommodate the distance and dimensions of a space between the source and the destination. In one example, light pipes may be constructed from transparent or translucent material to emit light along a path. In another example, light pipes may contain reflective material to direct light to the destination.

In the above examples, drive latch apparatus 100 may also include a latch 102 dimensioned to secure a hard drive to a chassis and coupled to a proximal end of light pipe 104 such that the light from light source 106 is transmitted to latch 102 and latch 102 refracts the light from light source 106 to emit a visible glow. In these examples, latch 102 may be transparent or translucent such that it refracts the light from light pipe 104 and visibly glows. For example, latch 102 may include a textured surface pitted to scatter light (e.g., frosted glass) such that the surface uniformly distributes the light across latch 102.

In one embodiment, light pipe 104 may be dimensioned to transmit the light from light source 106 to latch 102 with a minimal amount of loss such that the transmitted light is within a range of visibility. For example, light pipe 104 may be coated with reflective material to better transport light using internal reflection to minimize light leakage. Light pipe 104 may also be dimensioned to transmit light from any source location to any destination location. For example, an inflexible light pipe may transmit the light across a short distance, and a flexible tube light pipe may transmit the light from one side of the chassis to another side and/or may run through the chassis or be formed as an integral part of the chassis. In another example, light pipe 104 may also run through latch 102 to illuminate latch 102 from within latch 102. Alternatively, as in the above example of a textured surface, the surface of latch 102 may be smooth and/or transparent where light pipe 104 couples to latch 102 such that the light is effectively transmitted from light pipe 104 to latch 102.

In one example, light source 106 may include one or more light-emitting diodes coupled to the chassis. Alternatively, light source 106 may include one or more lamps, lasers, and/or other forms of illumination. In the embodiments disclosed herein, light-emitting diodes may provide advantages over the other forms of illumination due to the small size and/or low energy requirement of light-emitting diodes. In some examples, the light from light source 106 may indicate a state of the hard drive by altering a state of the light and/or a color of the light. For example, light source 106 may turn on the light, turn off the light, and/or flash the light in a pattern to indicate different states. Additionally, the color of the light may include a color of a light-emitting diode and/or a color of a combination of light-emitting diodes.

In the example of FIG. 1, the three light-emitting diodes may represent a red, a green, and a blue color. The state of the hard drive may be indicated by the light from a single light-emitting diode or a combination of the light-emitting diodes. For example, a fully operational hard drive may be indicated by only the green light-emitting diode, while a drive that needs to be serviced may be indicated by an amber color created by a combination of the red light-emitting diode and the green light-emitting diode.

Furthermore, the light-emitting diodes of FIG. 1 may include electronic leads that may be wired to a power source of the chassis. At light source 106, the light-emitting diodes may provide light to light pipe 104, which may then provide light to latch 102. Latch 102 may then refract the light generated by the light-emitting diodes as a glow visible to a human eye.

Figure 2:
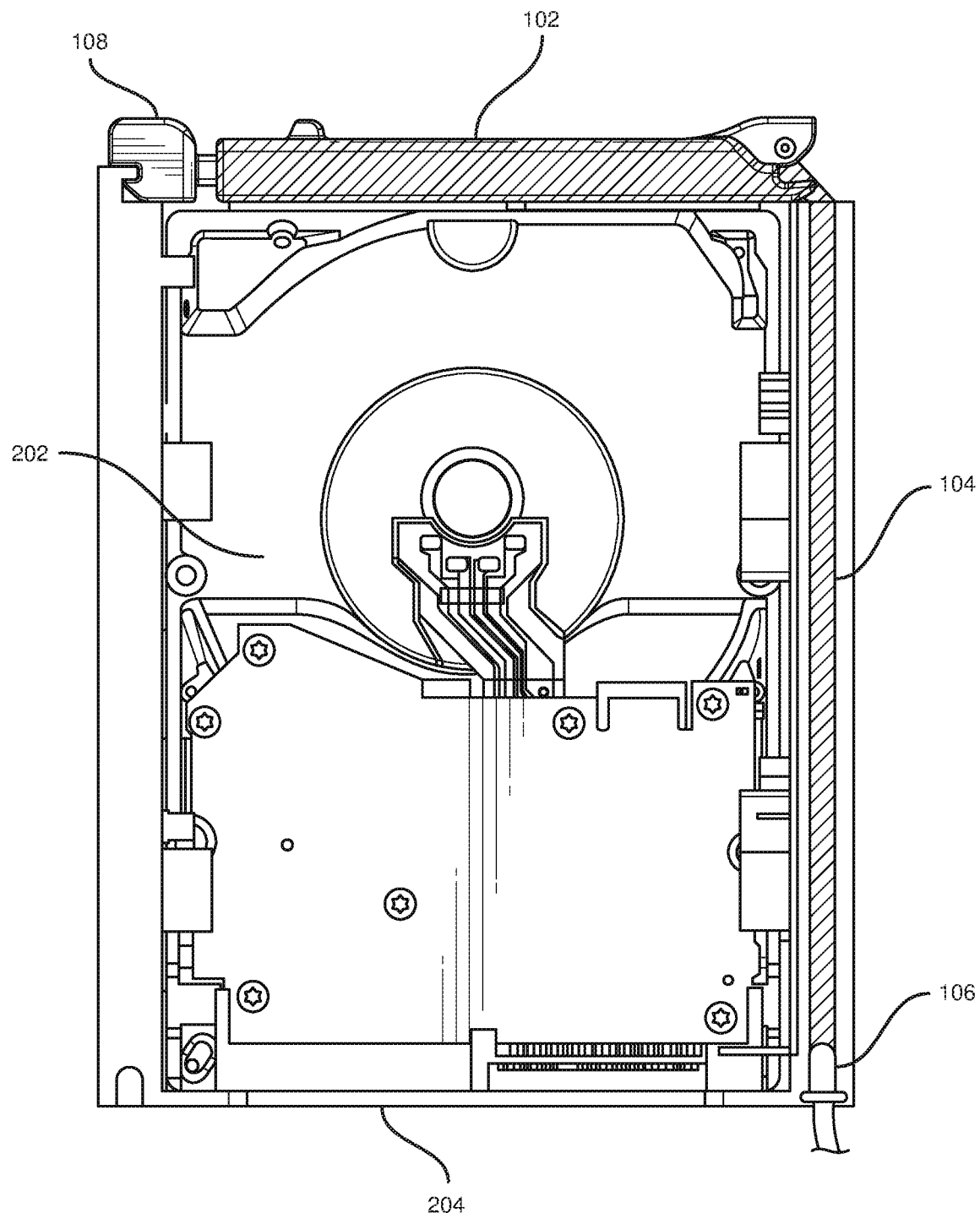
FIG. 2 is a side view of a drive latch apparatus securing a hard drive in a chassis.

FIG. 2 illustrates a side view of drive latch apparatus 100 securing a hard drive 202 in a chassis 204. The term "chassis," as used herein, generally refers to a base structure or framework that fits into a rack, such as in a drawer-like fashion, to house or support computing equipment. As used herein, the term "rack" generally refers to a physical framework designed to house electronic and/or computing equipment.

In one embodiment, latch 102 may be dimensioned to secure hard drive 202 to chassis 204 by locking in position. For example, latch 102 may be coupled to a locking mechanism 108 that is dimensioned to lock latch 102 to chassis 204. As shown in FIG. 2, locking mechanism 108 may be dimensioned to hook onto a ledge of chassis 204 in a locked position. Locking mechanism 108 may additionally contain a spring element or other mechanism to maintain the locked position. As locking mechanism 108 locks into position on chassis 204, latch 102 may secure hard drive 202 in a drive slot of chassis 204 by applying a downward force on hard drive 202.

Figure 3:
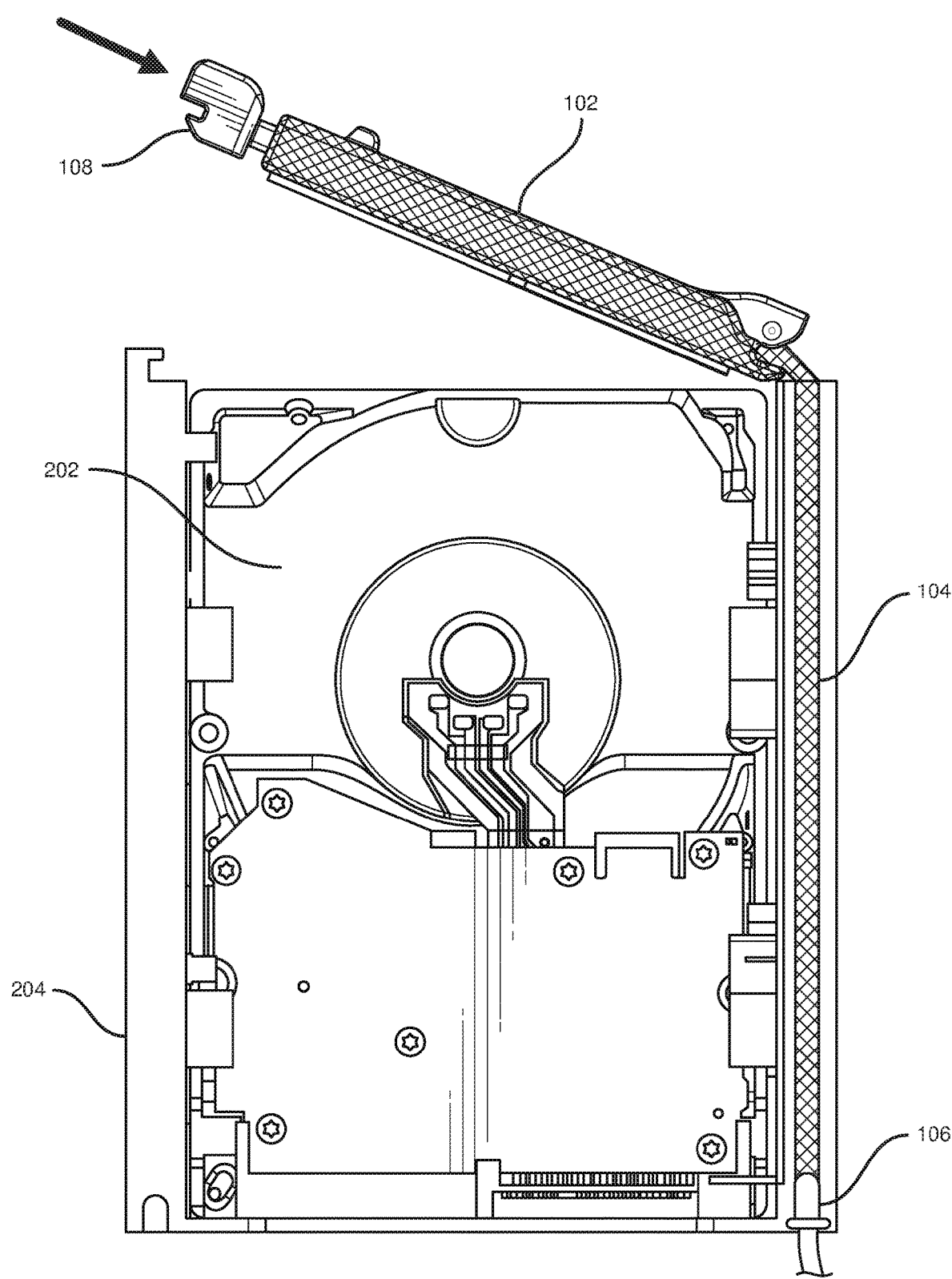
FIG. 3 is a side view of a drive latch apparatus for securing hard drives in an unlocked position.

FIG. 3 illustrates a side view of drive latch apparatus 100 in an unlocked position in chassis 204. In some embodiments, latch 102 may also be coupled to locking mechanism 108 such that locking mechanism 108 unlocks latch 102 as a force is exerted on locking mechanism 108. As shown in the example of FIG. 3, a horizontal force directly exerted on locking mechanism 108 may push locking mechanism 108 away from the ledge of chassis 204 and toward latch 102 such that latch 102 may be rotated upward and away from hard drive 202 to an unlocked position. Furthermore, in this example, light source 106 may provide a different color light to latch 102, in comparison to the example of FIG. 2, to indicate the unsecured state of hard drive 202.

Figure 4:
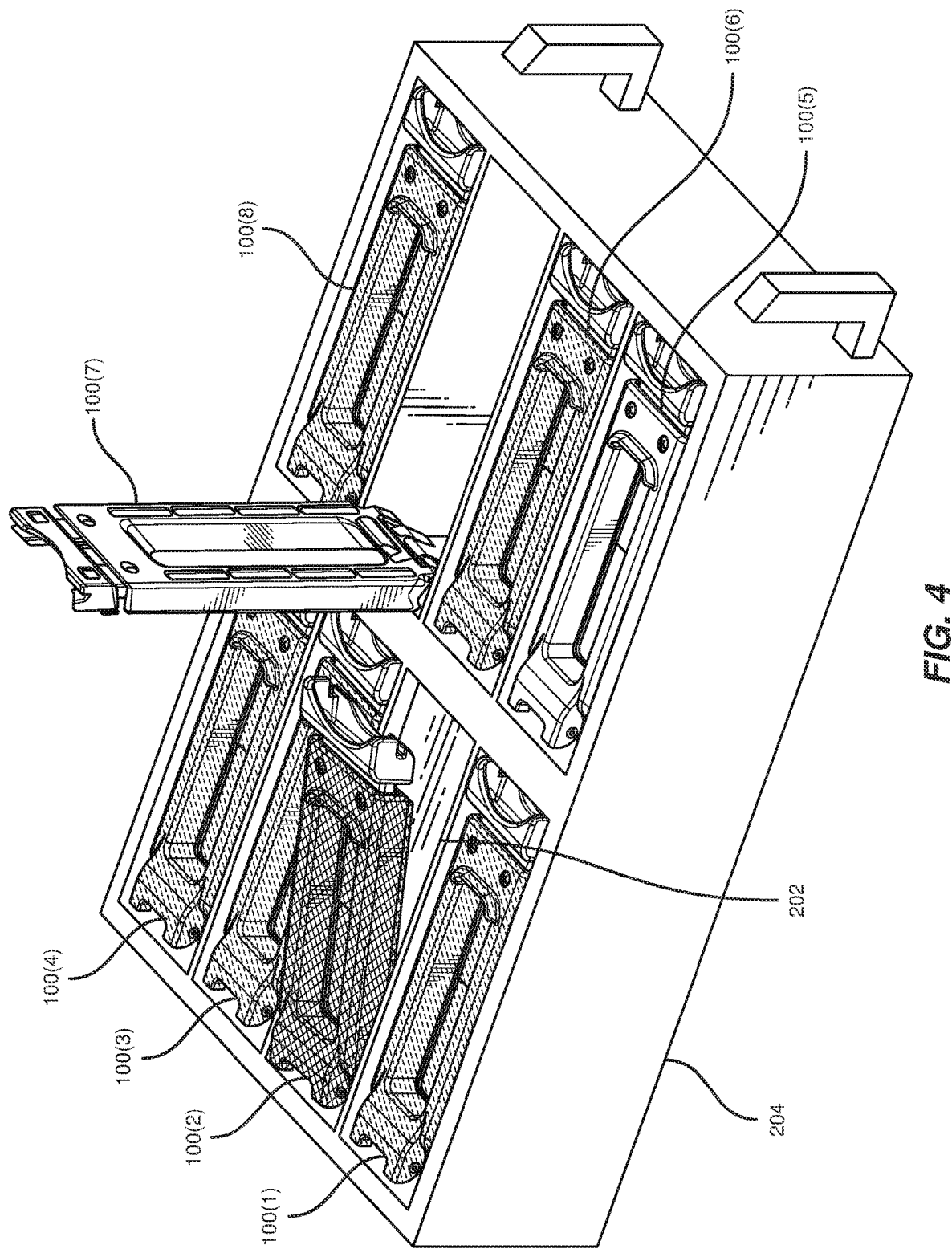
FIG. 4 is a perspective view of a chassis with multiple drive latches holding multiple hard drives.

FIG. 4 illustrates a perspective view of chassis 204 with multiple drive latch apparatuses 100(1)-(8) holding multiple hard drives. As shown in FIG. 4, drive latch apparatuses 100(1)-(8) may glow different colors to indicate the different states of each hard drive. Continuing a previous example, drive latch apparatuses 100(1), 100(3), 100(4), 100(6), and 100(8) may glow green to indicate the state of hard drives that are operating normally. Conversely, drive latch apparatus 100(2) may glow amber to indicate an error with hard drive 202 and/or to indicate that drive latch apparatus 100(2) is opened for servicing. In addition, drive latch apparatuses 100(5) and 100(7) may emit no glow to indicate that hard drives are not installed in the corresponding drive slots.

Figure 5:
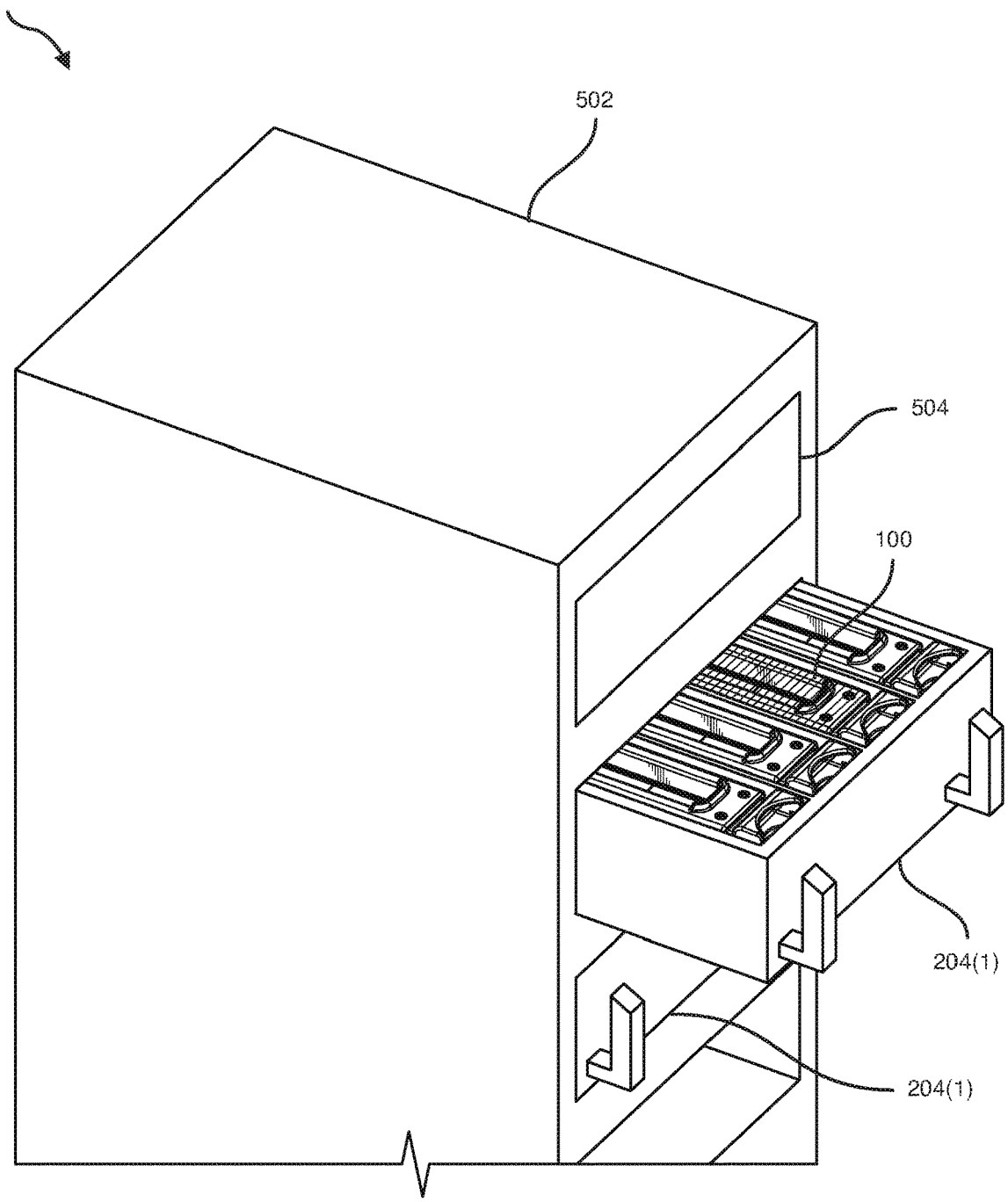
FIG. 5 is a perspective view of a hard drive rack system with multiple chassis containing hard drives.

FIG. 5 illustrates a perspective view of a hard drive rack system 500 with an open chassis 204(1) containing hard drives and a closed chassis 204(2). In some embodiments, hard drive rack system 500 may include a rack 502 dimensioned to hold computer hardware. Additionally, hard drive rack system 500 may include chassis 204(1) and 204(2) coupled to rack 502 that contain a plurality of drive slots dimensioned to hold one or more hard drives, such as hard drive 202 of FIG. 2. Furthermore, hard drive rack system 500 may include one or more drive latches, including drive latch apparatus 100, dimensioned to secure at least one hard drive in a drive slot and emit a visible glow to indicate a state of the hard drive. Finally, hard drive rack system 500 may include a computing component 504 coupled to rack 502 such that computing component 504 detects the state of the hard drive. In the example of FIG. 5, rack 502 may represent a data-center rack in a networked data center that contains multiple chassis to hold various servers and storage devices.

In some examples, chassis 204(1) and/or chassis 204(2) may be dimensioned to slide perpendicular to a face of rack 502 such that chassis 204(1) and/or chassis 204(2) extends away from rack 502 to expose the plurality of drive slots. As shown in FIG. 5, chassis 204(1) may extend horizontally away from the front of rack 502 to expose a plurality of drive latch apparatuses. In these examples, drive latch apparatus 100 may emit the visible glow such that drive latch apparatus 100 is visible from extended chassis 204(1). In addition, drive latch apparatus 100 may be coupled to a light pipe, such as light pipe 104 of FIG. 1, that transmits light across a distance from a light source, such as light source 106 of FIG. 1. As in the example of FIG. 1, light source 106 may include multiple light-emitting diodes coupled to chassis 204(1), chassis 204(2), and/or a distal part of rack 502 of FIG. 5. Light pipe 104 may then connect light source 106 from any location to drive latch apparatus 100 of FIG. 5.

In one embodiment, one or more of the light-emitting diodes may be communicatively coupled to computing component 504 such that computing component 504 alters the light from the light-emitting diodes. The term "computing component," as used herein, generally refers to an electronic hardware element that performs a distinct computing function. Notably, a computing component may control other hardware components, such as the light-emitting diodes of the disclosed systems. As illustrated in FIG. 5, computing component 504 may represent a separate component of rack 502 that receives information about each hard drive and sends a signal to light source 106 to indicate the correct state and/or color of light source 106. Alternatively, computing component 504 may be built into chassis 204(1) and/or 204(2) and/or into a drive slot to determine the state of a hard drive while it is in the drive slot.

Figure 6:
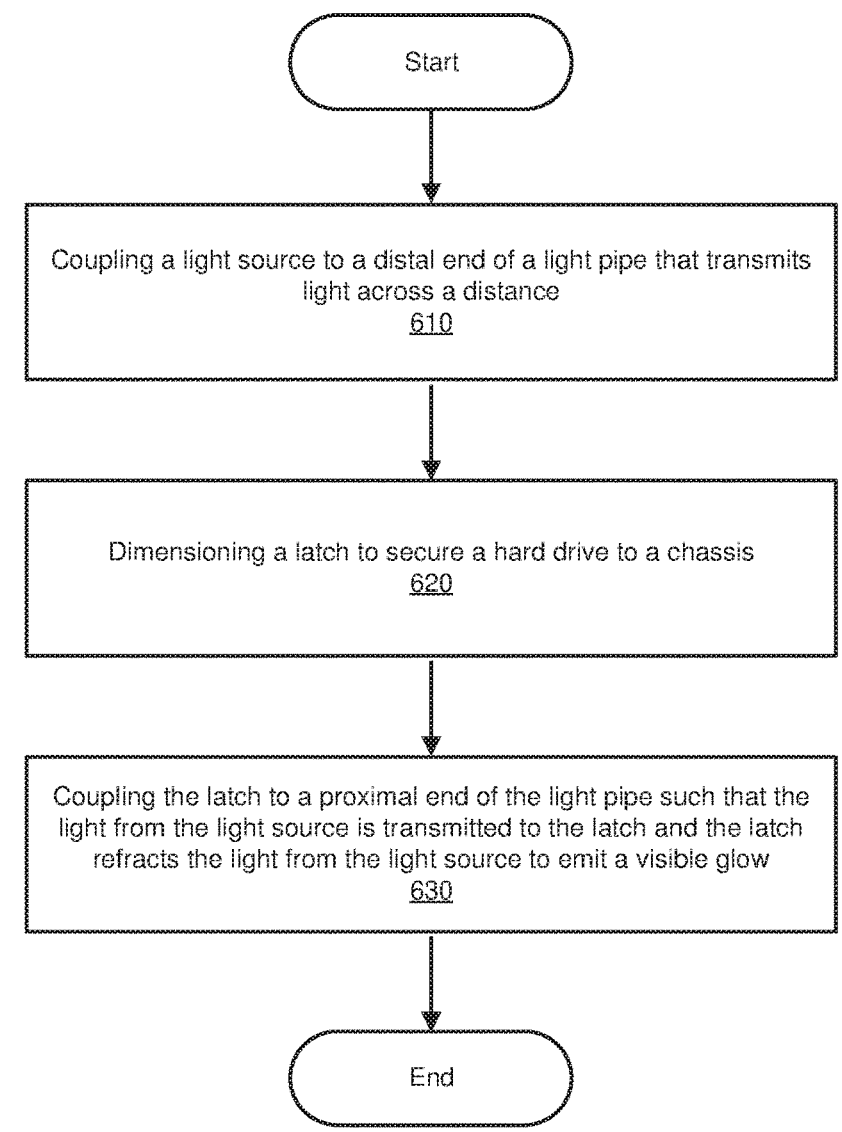
FIG. 6 is a flow diagram of an exemplary method for indicating the status of and securing hard drives.

FIG. 6 shows an example method for manufacturing, assembling, using, adjusting, or otherwise configuring or creating the systems and apparatuses presented herein. The steps shown in FIG. 6 may be performed by any individual and/or by any suitable type or form of manual and/or automated apparatus. In particular, FIG. 6 illustrates a flow diagram of an exemplary method 600 for assembling a drive latch apparatus.

As shown in FIG. 6, at step 610, a light source may be coupled to a distal end of a light pipe that transmits light across a distance. For example, as shown in FIG. 1, light source 106 may be coupled to the distal end of light pipe 104 to transmit light across light pipe 104. In this example, light source 106 may include one or more light-emitting diodes coupled to a chassis such that the light from light source 106 indicates a state of a hard drive by altering a state of the light and/or a color of the light. Furthermore, in this example, one or more light-emitting diodes may generate the light simultaneously. For instance, each light-emitting diode may have a different state and/or a different color of light that may combine to create the state and/or the color of the light transmitted through light pipe 104.

At step 620, a latch may be dimensioned to secure a hard drive to a chassis. For example, as illustrated in FIG. 2, latch 102 may be dimensioned to secure hard drive 202 in chassis 204. Additionally, latch 102 may be dimensioned to secure hard drive 202 to chassis 204 by coupling latch 102 to locking mechanism 108 that is dimensioned to lock latch 102 to chassis 204 and unlock latch 102 as a force is exerted on locking mechanism 108. In this example, locking mechanism 108 may contain a spring and/or may be constructed using a spring material that maintains a tension to keep latch 102 in the locked position when the force is not exerted on locking mechanism 108.

At step 630, the latch may be coupled to a proximal end of the light pipe such that the light from the light source is transmitted to the latch and the latch refracts the light from the light source to emit a visible glow. As shown in FIG. 2, latch 102 may be coupled to the proximal end of light pipe 104 such that the light from light source 106 is transmitted to latch 102 and latch 102 refracts the light to emit a glow. In this example, light pipe 104 may be inserted into one end of latch 102 to transmit light from the light-emitting diodes to latch 102. In alternate examples, the proximal end of light pipe 104 may lie adjacent to latch 102 or be coupled by other methods to ensure the light transmits to latch 102.

In some embodiments, method 600 may further include a step in which the light pipe may be dimensioned to transmit the light from the light source to the latch with a minimal amount of loss such that the transmitted light is within a range of visibility. In these embodiments, the light pipe may be constructed from a reflective material that internally reflects the light to prevent leakage outside of the light pipe. Alternatively, the light pipe, such as light pipe 104 of FIG. 1, may be constructed from a translucent or transparent material that distributes light to control the amount of light leakage and transmit a visible amount of light to the latch. Additionally or alternatively, the light pipe may be formed as an integral part of a latch apparatus or an integral part of a chassis.

As discussed throughout the instant disclosure, the disclosed methods, systems, and apparatuses may provide one or more advantages over traditional methods of securing hard drives in racks or displaying the states of hard drives. For example, the drive latch apparatuses described herein may emit a light to indicate the state of a hard drive secured by a drive latch. As another example, by coupling the drive latch to a light pipe, the systems described herein may position a light source in any location in a data center rack to optimize the rack configuration. Additionally, the disclosed light source may manifest different states of the light, such as persistent or intermittent lighting, and/or different colors of light to represent different hard drive states. Furthermore, the drive latch apparatuses described herein may secure the hard drives in a chassis that may be extended from the rack to easily view the drive latches. For example, the chassis nay be pulled out from the rack in a drawer-like fashion to expose a set of drive latches securing a set of hard drives, and even a cursory glance may permit a technician to identify a drive latch that glows a different color and/or has a different state compared to the remaining drive latches. Thus, the mechanisms disclosed herein may enable faster and easier identification of hard drive statuses while efficiently securing the hard drives in a rack.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A drive latch apparatus comprising: a light pipe that transmits light across a distance from a bottom corner of a hard drive chassis of a hard drive to a top corner of the hard drive chassis in a vertical direction to insert or remove the hard drive from a chassis extended horizontally away from a rack;
    a light source coupled to a distal end of the light pipe, wherein the proximal end of the light pipe inserts into a hinge end of a latch, the latch rotatably extends along a top surface of the hard drive chassis; and
    the latch that covers the top surface of the hard drive chassis and is dimensioned to secure the hard drive to the chassis and coupled to the proximal end of the light pipe such that:
    the light pipe transmits the light from the light source to the hinge end of the latch; and
        a sufficiently transparent material of the latch refracts the light, inside a body of the latch, from the light pipe such that a surface of the latch uniformly distributes the light across the latch to emit a visible glow from the hinge end to a locking mechanism dimensioned to hook onto a ledge of the chassis.

2. The drive latch apparatus of claim 1, wherein the light pipe is dimensioned to transmit the light from the light source to the latch with a minimal amount of loss such that the transmitted light is within a range of visibility.

3. The drive latch apparatus of claim 1, wherein the light source comprises at least one light-emitting diode coupled to the chassis.

4. The drive latch apparatus of claim 3, wherein the light from the light source indicates a state of the hard drive by altering at least:
    a state of the light; or
    a color of the light.

5. The drive latch apparatus of claim 4, wherein the color of the light comprises at least:
    a color of the light-emitting diode; or
    a color of a combination of light-emitting diodes.

6. The drive latch apparatus of claim 1, wherein the latch is coupled to the locking mechanism that is dimensioned to:
    lock the latch to the chassis; and
    unlock the latch as a force is exerted on the locking mechanism.

7. The drive latch apparatus of claim 1, wherein the latch secures the hard drive in a drive slot of the chassis.

8. A method comprising: coupling a light source to a distal end of a light pipe that transmits light across a distance from a bottom corner of a hard drive chassis of a hard drive to a top corner of the hard drive chassis in a vertical direction to insert or remove the hard drive from a chassis extended horizontally away from a rack;
- dimensioning a latch to secure the hard drive to the chassis, wherein the latch covers the top surface of the hard drive chassis; and
- inserting a proximal end of the light pipe into a hinge end of the latch such that:
  - the light pipe transmits the light from the light source to the hinge end of the latch, wherein the distal end of the light pipe extends along the side of the hard drive chassis; and
  - a sufficiently transparent material of the latch refracts the light inside a body of the latch, from the light pipe such that a surface of the latch uniformly distributes the light across the latch to emit a visible glow from the hinge end to a locking mechanism dimensioned to hook onto a ledge of the chassis.

9. The method of claim 8, wherein the light source comprises at least one light-emitting diode coupled to the chassis such that the light from the light source indicates a state of the hard drive by altering at least:
- a state of the light; or
- a color of the light.

10. The method of claim 9, wherein the color of the light comprises at least:
- a color of the light-emitting diode; or
- a color of a combination of light-emitting diodes.

11. The method of claim 8, wherein dimensioning the latch to secure the hard drive to the chassis comprises coupling the latch to the locking mechanism that is dimensioned to:
- lock the latch to the chassis; and
- unlock the latch as a force is exerted on the locking mechanism.

12. The method of claim 8, further comprising dimensioning the light pipe to transmit the light from the light source to the latch with a minimal amount of loss such that the transmitted light is within a range of visibility.

* * * * *